Sept. 11, 1951 R. A. SUTHANN 2,567,829

COMBINED CABINET AND CHASSIS FOR
MOUNTING ELECTRICAL COMPONENTS
Filed March 6, 1947

INVENTOR.
Robert A. Suthann
BY
[signature]
ATTORNEY

UNITED STATES PATENT OFFICE 2,567,829

COMBINED CABINET AND CHASSIS FOR MOUNTING ELECTRICAL COMPONENTS

Robert Andree Suthann, Los Angeles, Calif.

Application March 6, 1947, Serial No. 732,700

18 Claims. (Cl. 250—16)

This invention relates to a combination cabinet and chassis construction and more particularly, but not necessarily, to a chassis for mounting electrical components of a radio set, audio amplifier, loud-speaker, or the like.

In the construction of radio sets, audio amplifiers, loud-speakers, and the like, it is the general practice to provide a flat, metallic, box-like chassis on which the various instruments or parts are mounted. In such construction, when the loud-speaker is enclosed within a cabinet, such loud-speaker is mounted upon a separate panel which becomes a part of the large cabinet required to provide sufficient space for the several instruments, parts, and wiring assembly. Moreover, each receiver or reproducer, amplifier, or detector unit is normally assembled from a multiplicity of small parts (such as tube sockets separately attached to the chassis, etc.) so that much time is consumed in assembly.

It is therefore an object of this invention to provide a chassis for mounting electrical components and the like wherein the chassis is of a shape arranged to receive and surround the outer surface of the loud-speaker, the opposite side of the chassis being left free for the mounting of the several instruments and parts.

Another object is to provide a chassis which may be molded to form a single, unitary unit which will house the loud-speaker and provide convenient adapters and surfaces for mounting tubes, condensers, coils, and other parts in a compact, efficient, and easily accessible arrangement which will greatly simplify assembly problems.

Another object is to provide a chassis having the above characteristics which can be molded to provide the required opening for a loud-speaker and the required sockets for tubes, coils, transformers, condensers, etc., and thereby eliminate the difficult job of drilling and punching the chassis.

Another object is to provide a chassis having the above characteristics wherein the top, bottom, and side walls of the cabinet may be molded as an integral part of the chassis and thereby greatly simplify the construction of the cabinet and chassis.

A further object is to provide a novel, combined terminal and receptacle for receiving the prongs of an electron discharge tube and the plug of an electrical conductor associated therewith.

A still further object is to provide a unitary chassis having molded therein the required receptacles and terminals for mounting the various instruments and parts, which terminals extend through the body of the chassis and are accessible for receiving the plugs of conductors from either side of the chassis.

These and other objects will be made apparent throughout the further description of the invention when taken in connection with the accompanying drawings, wherein like reference characters refer to like parts. It is to be understood that the drawings are not a definition of the invention but merely illustrate certain forms by which the invention may be effectuated.

Figures 1, 2, 3, 4, 5, 6:
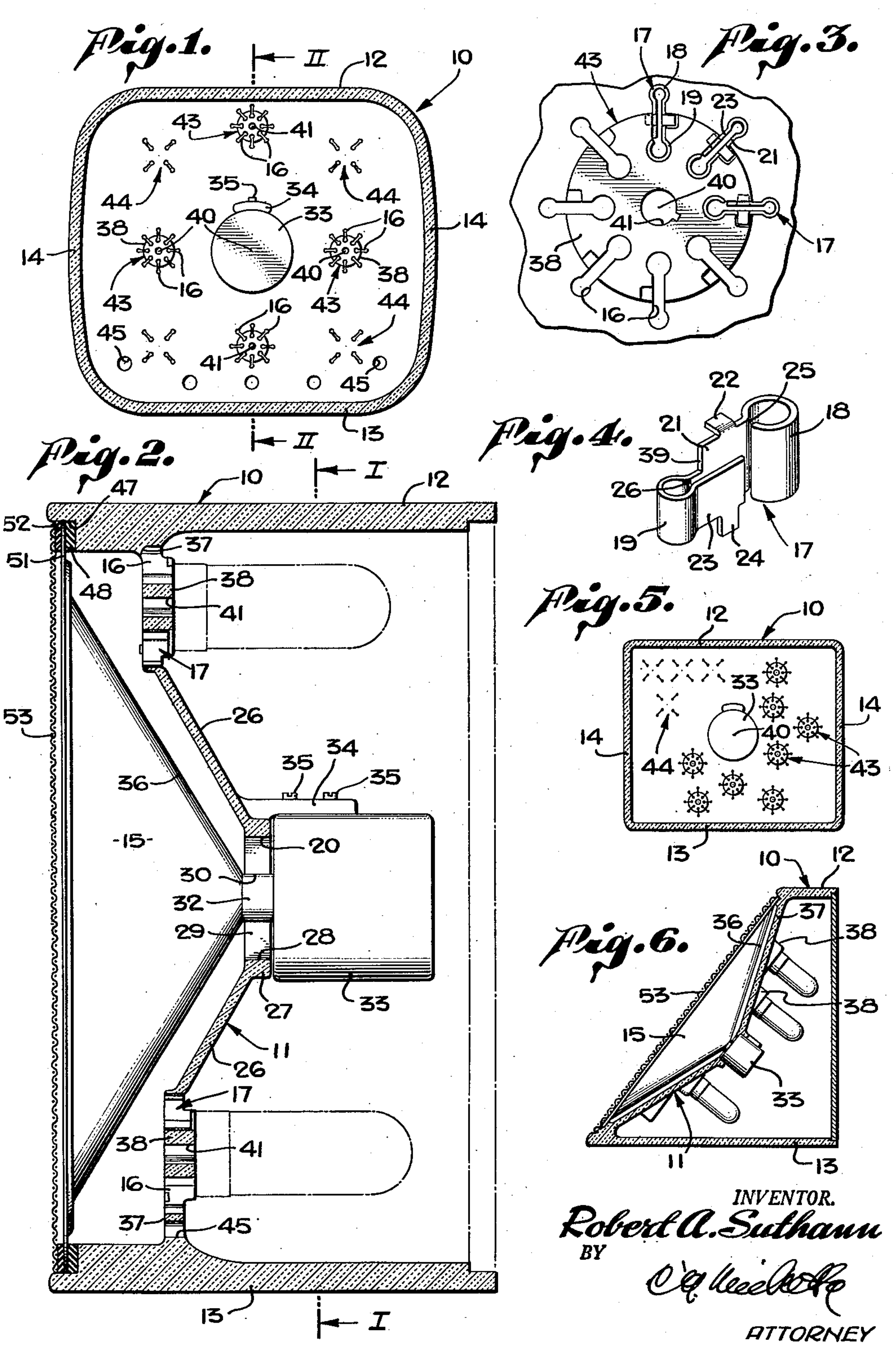
Fig. 1 is a sectional view of a cabinet and chassis construction embodying this invention and taken along the line I—I of Fig. 2.
Fig. 2 is a sectional view of the cabinet and chassis construction taken along the line II—II of Fig. 1.
Fig. 3 is an enlarged view of a vacuum tube receptacle assembly embodied in the invention.
Fig. 4 is a perspective view of a combined receptacle and terminal embodied in the invention.
Fig. 5 is a view of a cabinet and chassis construction similar to Fig. 1 and illustrating a different arrangement of tube receptacles and terminals for mounting the various instruments and parts.
Fig. 6 is a view similar to Fig. 2 illustrating a different cabinet and chassis construction embodying this invention.

Referring to the drawings, Figs. 1 and 2 illustrate one form of the present invention wherein 10 indicates a cabinet in its entirety and a chassis for mounting electrical components is indicated in its entirety by 11. In this particular form, the top 12, bottom 13, and side walls 14 of the cabinet and chassis 11 are molded integrally. The chassis may be formed separate from the cabinet and installed within the cabinet by any suitable means. It is preferable, however, that the chassis be molded or otherwise formed in a single unit and formed to provide an opening 20 for mounting a loud-speaker 15 and the required number of openings 16 for receiving combination receptacles and electrical terminals or elements 17.

Each of the elements represented in its entirety by 17, consists of a single piece of electrically conducting material formed to provide a tubular receptacle 18 at one of its ends and a tubular receptacle 19 at its other end, the receptacle 18 and the receptacle 19 being spaced apart by a flat intermediate portion 21. The portion 21 may be provided with a tab 22 bent at right angles to the plane of the portion 21 for engaging a cooperating surface of the chassis for positioning the element 17 in its associated opening 16. One side of the receptacle 19 may terminate in an inwardly extending flat portion 23, the flat portion 23 being substantially parallel to portion 21. The lower edge of portion 23 is provided with a tab 24 for the purpose of bending over the associated surface of the chassis on the opposite side of the chassis to the tab 22. The tabs 22 and 24 cooperate to lock the element 17 into rigid, fixed relation with the chassis. Tab 24 may be pre-bent into a lug arranged to snap into a recess of the body portion of the chassis. The element 17 is preferably made of spring material and it will be evident from Fig. 4 of the drawings that one side of the receptacle 18 and receptacle 19 are disconnected at 25 and 26 respectively, which permits them to spring outwardly when a prong of a tube or a plug of a conductor is inserted in them. This spring tension effects gripping contact between the cooperating connectors and makes for good electrical contact.

The cabinet 10 as shown in Figs. 1, 2, and 5, may be square or substantially square, as shown, and the chassis 11 positioned adjacent but inwardly of the forward end of the cabinet 10. The intermediate portion of the chassis 11 may be frusto-conical in shape, as shown at 26. The inner end of the frusto-conical portion 26 may terminate in a relatively thick, annular flange 27, the inner surface 28 of the annular flange 27 providing a seat for a spider 29, the latter having a central opening 30 therethrough for receiving the inner end 32 of the cone shaped loud-speaker 15. At the rear of the chassis 11, and preferably coaxial therewith, is mounted the field coil or field magnet assembly, represented in its entirety by 33. A suitable bracket 34 carried by and integral with the flange 27 and the adjacent portion of the frusto-conical portion 26 may be provided for supporting the assembly 33, the assembly 33 being fixed to the bracket 34 by any suitable means, such as screws 35. The conical surface 36 of the loud-speaker is mounted in spaced relation from the chassis 11. Suitable baffles or sounding board may be provided to prevent direct contact of the cone diaphragm and voice coil assembly with the molded chassis 11.

The outer, peripheral edge of the frusto-conical portion 26 terminates in a vertically disposed, annular flanged portion 37. The flanged portion 37 is provided with spaced portions 38 which may be somewhat thicker than the portion 37 through which a portion of the openings 16 extend. The elements 17 are preferably arranged radially about the center 40 of the thickened portions 38. As illustrated in Fig. 3, the thickened portions 38 are preferably round and provided at the center thereof with an opening 41 for receiving an orienting or polarizing key. The opening 41 operates to position the prongs of a tube coaxial with their respective sockets 18. That portion of the opening 16 adapted to receive the receptacle 19 of the element 17 may extend outwardly from the thickened portion 38 and the element 17 may be reduced, as shown at 39 to correspond in depth with the associated portion of the opening 16.

Fig. 1 shows the arrangement for a four tube set, the tube assemblies being shown at 43, and additional elements 17 are shown positioned radially of the thickened portions 38 at 44. The elements at 44 may be used for mounting condensers, coils, or other parts and as many of these elements may be provided as required.

Fig. 5 illustrates the rear view of a chassis adapted to accommodate eight tubes and a plurality of other elements, indicated in their entirety by 44, for the purpose described in connection with Fig. 1.

Fig. 6 is a vertical sectional view illustrating a different embodiment of the invention wherein the chassis 11 is disposed at an angle for receiving a loud-speaker 15 in the manner shown. This embodiment is particularly adaptable for smaller sets where fewer tubes and other parts are required and the cabinet may be angularly constructed and provide sufficient place for the mounting of the instruments, wiring, etc.

It will be noted that the terminals 19 extend through the thickness of the chassis and that conductors may be run from one side of the chassis by way of openings 45 and the plugs of the conductors inserted in the terminals 19 from either side of the chassis.

The forward end of the cabinet may be provided with an internal recess, as shown at 47, for accommodating suitable insulation 48 and the peripheral edges 51 of the loud-speaker, as well as suitable insulation 52 disposed between the edges 51 of the loud-speaker and the conventional grill 53.

The chassis 11 is molded from non-conductive, dielectric material, such as any phenolic condensation product and as explained above, the chassis may be molded separately from the cabinet and the cabinet made of different material than the chassis and the chassis connected therein and suitably insulated therefrom when such insulation is desirable. In the preferred form, the chassis is molded from cellulosic derivatives, phenolic resins, and other resins and compositions of similar properties. It is to be understood, however, that the chassis may be formed of any suitable dielectric material which will afford the proper insulating properties when terminals are to be pre-cast or pressed into the partition or chassis. The chassis and walls may be molded or pressed from metal, (thereby permitting the use of a large speaker in a small cabinet) and the electrical components such as tubes, etc. then connected to the partition in a usual manner.

Accordingly, there is provided a chassis of such shape as will receive and house a loud-speaker and constructed and arranged for mounting various instruments and electrical components in a compact, easily accessible, and efficient manner. The novel combination receptacle and terminal carried in openings provided in the chassis may be molded in the chassis and access may be had with the terminals on either side of the chassis for inserting a conductor plug. While certain arrangements of the openings for mounting the loud-speaker, other instruments and electrical components have been illustrated, it will now be obvious to those skilled in the art that any number of openings or elements 17 may be molded within the body of the chassis and arranged in accordance with specific requirements of the particular job to be done. Elements 17 may assume various forms and, when used as terminals may provide for reception of two, three or more plugs or ends of conductor wires. Some elements 17 held by the body of the partition 26 may be provided with internally threaded bores to readily receive screws by which transformers, coils or other elements are attached. Other changes, modifications, substitutions, additions, and omissions may be made in the forms shown without departing from the spirit and scope of the appended claims.

I claim:

1. In a combined cabinet and chassis for a loudspeaker and circuit components, the combination of: a chassis member of frusto-conical form, and substantially plane wall elements extending axially rearwardly from areas contiguous to edges of the chassis member at its larger diameter to form a rear enclosure defined by said wall elements and the chassis member; means forming a plurality of selectable openings in the chassis member to receive and support electrical components; said chassis member including means for supporting a reproducing speaker in the recess formed by the concave surface of the chassis member.

2. A construction of the character stated in claim 1, wherein the chassis member and wall elements are unitary and composed of a dielectric composition.

3. A construction of the character stated in claim 1 wherein the chassis member and wall elements are unitary and composed of a dielectric composition, said chassis member carrying metallic terminals arranged to receive prongs of electron discharge tubes and terminals of electrical conductors.

4. In a combined cabinet and chassis for a loudspeaker and circuit components: side wall elements and a partition connecting the wall elements and integral therewith, said partition being adjacent one end of said wall elements; a centrally located port in the partition; means including a supporting bracket adjacent the port arranged to hold a reproducing unit on one side of said partition; and selectable means including the other side of the partition and disposed radially about said port for the reception of said components.

5. A radio construction including a self-contained unitary chassis for the component parts of a radio receiver, said chassis comprising a dielectric member having a frusto-conical portion, and a conical-shaped loud speaker carried by said chassis and having corresponding portions thereof mounted within the said frusto-conical portion of said chassis, said frusto-conical portion being provided with a thickened portion having an opening therethrough, with the conical-shaped loud speaker extending into said opening, and means extending transversely between said speaker and said chassis for supporting said speaker.

6. A construction of the character described comprising: a self-contained unitary cabinet and chassis provided with an open end of maximum area; said chassis extending across the interior of the cabinet and connecting edge margins of the open end, said chassis being provided with a central opening spaced inwardly from the plane of the open end, said chassis being provided with a plurality of selectable openings arranged around said central opening to receive and support electrical components; means carried by said chassis for mounting an associated loud speaker in said central opening; electrical terminals cooperable with the selectable openings, each terminal comprising a single strip of electric-conducting material formed to provide a tubular receptacle receivable within one of the selectable openings, said electrical terminal including integral means for engaging opposite sides of the chassis.

7. A construction of the character described comprising: a self-contained unitary cabinet and chassis provided with an open end; said chassis extending across the interior of the cabinet and connecting edge margins of the open end and provided with a central opening, said chassis being provided with a plurality of selectable openings arranged around said central opening to receive and support electrical components; and means carried by said chassis for mounting an associated loud speaker in said central opening.

8. A construction of the character stated in claim 7 wherein electrical terminals are cooperable with the selectable openings, each terminal including a single strip of electric-conducting material formed to provide an electrical contact member receivable within one of the selectable openings.

9. A construction of the character described comprising: an integral one-piece cabinet and chassis of dielectric material provided with an open end; said chassis forming a partition extending across the interior of the cabinet and provided with a central opening spaced inwardly from the plane of the open end for mounting an associated loud speaker therefrom, and a plurality of selectable openings arranged in said partition around said central opening for receiving and supporting circuit components.

10. In a construction of the character described including a self-contained unitary cabinet provided with an open end for housing a loud speaker, the combination of: a partition extending across the interior of the cabinet and connecting walls of the cabinet, said partition being spaced inwardly from the plane of the open end and provided with a plurality of selectable openings for receiving and supporting electrical components; and electrical terminals cooperable with the selectable openings.

11. A radio construction including a self-contained unitary chassis formed of an electrical, non-conducting material and having a frusto-conical-shaped portion for receiving a corresponding portion of a conical-shaped loud speaker, the said chassis being provided with a thickened portion concentric with the axis of the chassis, means forming an opening in the center of said thickened portion and means forming a plurality of openings radially disposed about said center opening.

12. A radio construction including a chassis integrally formed of dielectric material and having a frusto-conical-shaped portion for receiving a corresponding portion of conical-shaped loud speaker, a central thickened portion in said frusto-conical-shaped portion having an opening therethrough and a plurality of thickened portions radially disposed about said center thickened portion, the said radially disposed, thickened portions having means for engaging and supporting component parts of a radio receiver.

13. A radio construction including a cabinet, a self-contained unitary chassis disposed in said cabinet, said chassis having a frusto-conical portion, a loud speaker disposed in said cabinet and extending into said frusto-conical portion and means including a thickened portion formed centrally of said chassis and an opening therethrough for supporting said loud speaker.

14. A radio construction in accordance with claim 13, wherein the said frusto-conical portion is provided with a plurality of openings radially disposed about the center thereof, electrical terminals mounted in said openings for receiving and supporting the component parts of a radio receiver.

15. A radio construction in accordance with claim 13, wherein the said frusto-conical portion is provided with a plurality of openings radially disposed about the center thereof, electrical terminals mounted in said openings for receiving and supporting the component parts of a radio receiver, the said terminals including a signal strip of electrical conducting material formed to provide spaced tubular receptacles and means integral with each terminal for engaging opposite sides of said frusto-conical portion.

16. A radio construction including a radio receiver set, a sound reproducing unit, a combined self-contained unitary chassis for supporting the component parts of said set and the said unit, the said chassis having a frusto-conical portion, a thickened portion, means forming an opening in the center of said thickened portion and means forming a plurality of openings radially disposed about said center opening.

17. A radio construction in accordance with claim 16, wherein the said chassis is provided with a plurality of thickened portions circumventing the said radially disposed openings.

18. A radio construction in accordance with claim 16, wherein the said chassis is provided with a plurality of thickened portions circumventing the said radially disposed openings, the said center thickened portion and the said radially disposed thickened portions presenting surfaces substantially parallel one to the other.

ROBERT ANDREE SUTHANN.

REFERENCES CITED

The following references are of record in the file of this patent:

UNITED STATES PATENTS

| Number | Name | Date |
|---|---|---|
| 1,641,223 | Gaynor | Sept. 6, 1927 |
| 1,652,257 | Stevenson | Dec. 13, 1927 |
| 1,686,878 | Raasch | Oct. 9, 1928 |
| 1,768,669 | Davis | July 1, 1930 |
| 1,847,456 | Weinberger et al. | Mar. 1, 1932 |
| 1,952,539 | Douw | Mar. 27, 1934 |
| 2,028,035 | Anderson | Jan. 14, 1936 |
| 2,135,144 | Petersen | Nov. 1, 1938 |
| 2,137,035 | Swallow | Nov. 15, 1938 |
| 2,174,107 | Kenney | Sept. 26, 1939 |
| 2,199,555 | Andrews | May 7, 1940 |
| 2,217,279 | Karns | Oct. 8, 1940 |
| 2,220,305 | Turney | Nov. 5, 1940 |
| 2,256,270 | Swift | Sept. 16, 1941 |
| 2,261,170 | MacCarthy | Nov. 4, 1941 |
| 2,272,660 | Emde | Feb. 10, 1942 |
| 2,275,507 | Crowley et al. | Mar. 10, 1942 |
| 2,312,181 | Matthews | Feb. 23, 1943 |
| 2,468,727 | Bauman | May 3, 1949 |

FOREIGN PATENTS

| Number | Country | Date |
|---|---|---|
| 290,350 | Great Britain | May 10, 1928 |
| 485,841 | Germany | Nov. 6, 1929 |